Figure 1:
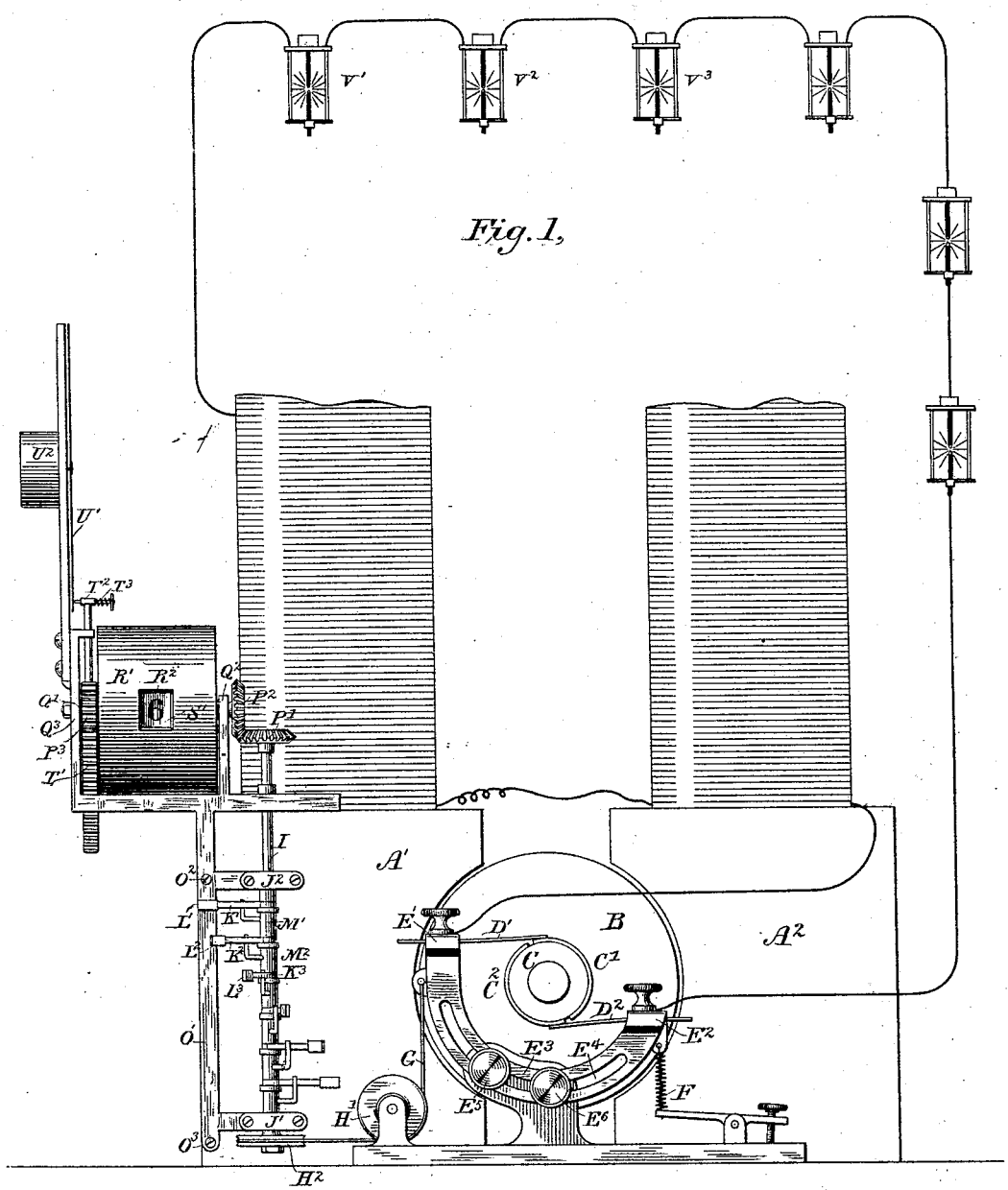

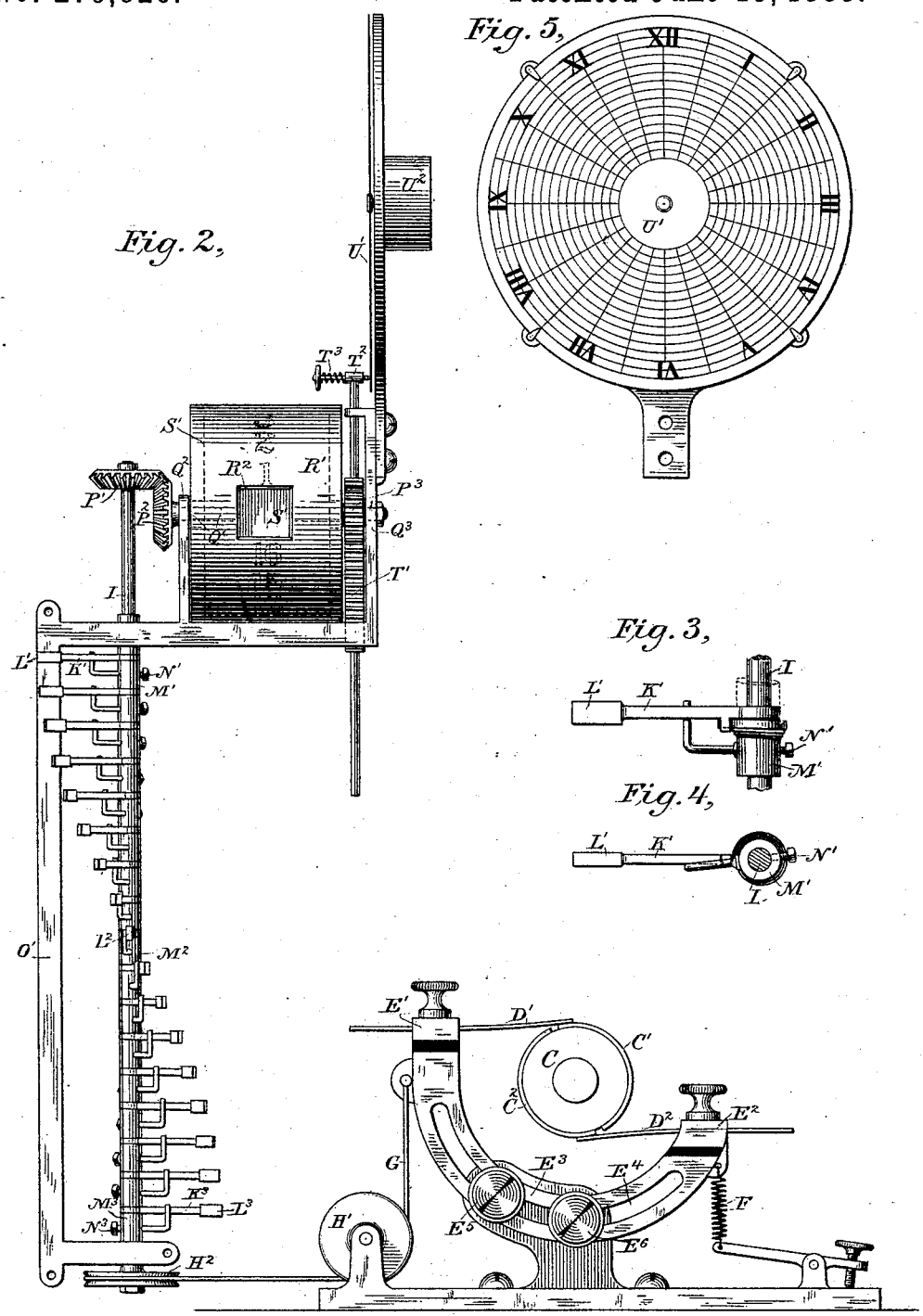

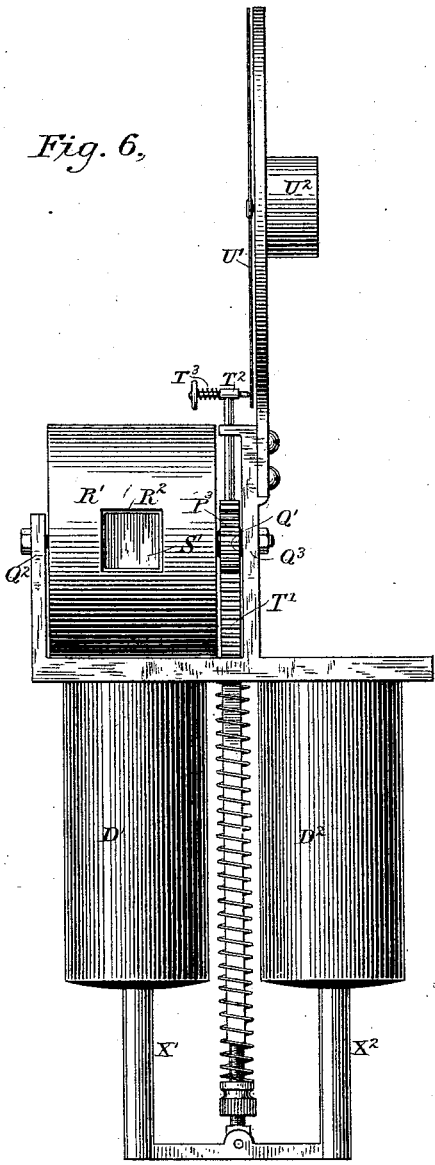

UNITED STATES PATENT OFFICE.

ROBERT J. SHEEHY, OF NEW YORK, N. Y.

COMBINED CURRENT-INDICATOR AND COMMUTATOR-ADJUSTER FOR DYNAMO-ELECTRIC MACHINES.

SPECIFICATION forming part of Letters Patent No. 279,826, dated June 19, 1883.

Application filed August 18, 1882. (No model.)

*To all whom it may concern:*

Be it known that I, ROBERT J. SHEEHY, a citizen of the United States, residing in the city, county, and State of New York, have invented certain new and useful devices for indicating and recording changes in the conditions which at any time exist in an electric circuit, and for automatically adjusting the commutator-brushes of a dynamo-electric machine, rendered necessary by such changes, of which the following is a specification.

My invention is more especially applicable to electric lighting systems.

It particularly relates to a system of indicating and recording (preferably in the vicinity of the electric generator) the electrical conditions within the circuit—as, for example, the current strength, the resistance, or the number of lamps that are at any time simultaneously in operation upon said circuit.

It further relates to the proper adjustment of the commutator-brushes of those electric-current generators in which said readjustment is rendered necessary by changes in the electrical conditions of the external circuit.

To these ends my invention may be said to consist in a method of and apparatus for indicating and recording the strength of current, or the resistance, the number of lights, and other conditions which at any time exist on the external circuit of an electric generator, and in a method of and apparatus for readjusting the commutator-brushes when, by reason of a change in said conditions, a readjustment of said brushes is rendered desirable.

My invention may be described, in general, as follows: The degree of magnetization of the pole-pieces of the dynamo-machines employed in many of the electric lighting systems is subject to variations, dependent upon the strength of current or the resistance of the external circuit supplied by said machine, and hence dependent upon the number of lights or other translating devices in said circuit. This polar force varies with said conditions; thus, in certain self-governing dynamo-machines it increases with the number of lights in the circuit. I preferably employ these variations in the magnetism of the pole-pieces as an actuating source of power with which to cause the revolution of a shaft for propelling the mechanisms of a visual signal and a recording device; but I remark that magnetic variations other than those exhibited by the said pole-pieces, yet caused by the current from said machine, may be also employed with advantage. I further employ the revolution of the same or a similarly-actuated shaft to cause (through the agency of intermediate mechanism) the brushes of an angularly-adjustable commutator to be moved in opposition to the force of a retractile spring in a direction dependent upon changes in the strength of the current traversing the external circuit.

My invention further includes certain details of mechanism, the particular subject-matter claimed being hereinafter specifically designated.

My invention is illustrated in the accompanying drawings, in which Figure 1 is designed as a general diagram of my complete system. Fig. 2 is a detailed view of the revolving shaft and magnet-armatures, also exhibiting the recording and indicating devices. Fig. 3 is an enlarged view of one of the magnet-armatures and the means of its attachment to the shaft. Fig. 4 shows the same in transverse section. Fig. 5 is a face view of the recording-plate or revolving dial; and Fig. 6 shows an electro-magnetic device which may be placed in the circuit of a dynamo-machine for carrying out my invention, instead of by availing of the magnetic variations of the field-magnet pole-pieces.

Parts appearing in more than one figure are designated by similar reference-letters in each.

A', A² are the soft-iron pole-pieces of a dynamo-electric machine, any one of numerous forms of which may be used, that shown in the drawings being regarded merely as a type. The armature of this machine is shown at B, its commutator at C, the segments of the latter at C' and C², the brushes at D' and D², and the brush-holders at E' E². The latter are carried by but insulated from the curved carrier E³, which is provided with the curved slot E⁴, through which the shafts of the screws E⁵ and E⁶ pass so loosely as to freely admit of a sliding movement of the carrier upon the same under the action of the adjustable spring F, or the varying tension of the cord G. This cord passes over the circumference of the pulleys H' and H², being attached at a certain point on the latter. A revolution of the shaft will therefore cause a change in the angular position of the brushes and in their points of contact with the commutator-segments. The shaft I revolves in bearings J' and J², between which it carries a series of small armature-levers, K' K², &c., severally provided with soft-iron armature-pieces L' L², &c. The levers are loosely attached to the shaft I, but said shaft is provided with the fixed brackets M' M², &c., securely attached to said shaft by binding-screws N' N², &c., a specimen of which is shown more clearly in Figs. 3 and 4. The brackets M' M² are arranged spirally upon the shaft I. The rod O', of soft iron, preferably electroplated, is intimately attached by means of the screws O² and O³ to the pole-piece A'. It will therefore partake of the magnetic polarity excited in said pole-piece. Assuming the shaft I to be in the position shown in Figs. 1 and 2, it will be evident that a strong magnetic attraction will be exerted by the bar O' upon the armature L'; but in consequence of the spiral arrangement of the brackets the attraction for the armature L² will be somewhat less, and still less for the armature L³, &c. If the attractive force be sufficient to cause the revolution of the shaft I in opposition to the force of the spring F, the shaft will turn sufficiently to bring said armature in contact with the bar O', and the armatures L² L³, &c., will now be slightly moved toward said bar. If the magnetic force be still further increased, the armature L² will be attracted sufficiently to turn the shaft as before, the bracket M' will leave its armature in contact with the bar O', and the position of the brushes will also be changed. In this manner the shaft I will be made to revolve through successive parts of a single revolution, the extent of the arc of its revolution depending upon the degree of magnetic force developed in the bar O'. The commutator-brushes will in the manner described receive a corresponding angular motion, dependent upon the dimensions of the pulleys H' H², the proper dimensions of which are empirically predetermined. The shaft I carries also the beveled pinion P', engaging with a similar pinion, P², carried by the axis Q', revolving in bearings at Q² and Q³. This shaft passes through the case R', which is provided with an aperture, R², through which the drum S', carried by the shaft Q', is visible. The pinion P³ gears with the rack T'. The latter carries the stylus T², normally pressed by means of the spring T³ upon the dial U', a face view of which is shown at Fig. 5. The dial is provided with a clock-work mechanism incased at U² for uniformly rotating the same. It is also marked with reference-lines, both radial and circular, of well-known significance for use in interpreting the records marked thereupon by the stylus.

The operation of the registering device thus described is as follows: The revolutions of the shaft cause corresponding revolutions of the drum S', and consequently the angular position of the said shaft will determine what portion of the face of the drum shall be visible through the aperture or opening R², and as said drum is marked with figures representing the number of lights in circuit, the resistance, the strength of current in same, or other conditions, the positions of said shaft will determine which of said figures shall be visible. The positions of these figures are predetermined and placed upon said drum once for all. Further, the revolutions of said axis Q' will determine the excursions of the stylus, and will hence enable it to make its record along one or other of the circular lines upon the said revolving dial.

The circuits employed are exhibited in Fig. 1. The lights are shown at V' V² V³, &c., and the machine is electrically organized in a well-known manner not requiring explanation.

This invention is especially applicable to those electric lighting systems in which the dynamo-electric generator is provided with an automatic or otherwise acting governor for increasing or decreasing the rapidity of the revolutions of the armature made necessary by changes in the external resistance of the interpolar or external circuit. With such machines it will be necessary, upon the occurrence of any change in the conditions of the external circuit, to readjust the brushes, which may be effected by the appliances herein shown or other equivalents. The changes in the degree of magnetism of the pole-piece by the introduction or withdrawal of any light into or from the circuit will, in the manner described, be at once indicated and recorded, thus enabling the operator at the governing-station to be at once advised of the external conditions of his circuit.

It is not absolutely necessary to utilize the changes of magnetization in the pole-pieces A' A², and where that is not convenient the device shown in Fig. 6 may be used, consisting of the hollow electro-magnet helices D' D², provided with axial cores X' X², which by their changes of position (as determined by the variations of strength in the current traversing the coils of the said helices) will vary the position of the rack T' and stylus T², and effect the revolution of the shaft Q and the drum S', and produce a record upon the dial U' in the manner hereinbefore described.

I do not narrowly limit myself to the exact devices and appliances shown, for, in addition to said devices, I desire to protect by this instrument the general principle involved.

I claim as my invention—

1. The combination, substantially as hereinbefore set forth, of a series of armatures, a series of levers for carrying said armatures, a shaft for carrying said levers loosely, and a series of brackets carried rigidly by said shaft and projecting into the respective paths of said levers, for the purpose of communicating their movements to said shaft.

2. The combination, substantially as hereinbefore set forth, of a series of armatures, a shaft, a series of levers, respectively carrying said armatures and loosely collared upon said shaft, and means whereby the movements of said armatures under the action of electro-magnetism shall cause the revolution of said shaft.

3. The combination, substantially as hereinbefore set forth, of the pole-piece of an electro-magnet, a shaft the axis of which is parallel with said pole-piece, a series of armatures arranged for operation in an approximate spiral upon said shaft, means by which the movements of consecutive armatures toward said pole-piece by virtue of its attraction may compel a rotation of said shaft, increasing in degree with the number of armatures which are drawn to said pole-piece.

4. The combination, substantially as hereinbefore set forth, of a shaft, a loose collar upon said shaft, an extension of said collar, an armature upon said extension, a pole-piece attracting said armature, and a rigid pin or bracket projecting from said shaft across the path of said extension on the side nearest said pole-piece, whereby the movements of said armature toward said pole-piece may cause the revolution of said shaft, and further movements of said shaft may not be prevented by said bracket.

5. The combination, substantially as hereinbefore set forth, of a shaft, a drum mounted upon said shaft, characters imprinted upon the grooved surface of said drum, a case enveloping said drum and provided with an aperture, through which said characters may be successively seen as the drum is revolved, and means for revolving said drum correlatively with changes in the electrical conditions of an electric circuit as expressed by said characters.

6. The combination, substantially as hereinbefore set forth, of a shaft, a drum carried by said shaft, characters upon said drum representing the number of translating devices upon an electric circuit, and means for revolving said shaft correlatively with changes in the number of said translating devices which are at any time in actuation.

7. The combination, substantially as hereinbefore set forth, of an electro-magnetically-revolved shaft, an indicating device, substantially such as described, actuated by one end of said shaft, and a commutator-brush adjuster, substantially such as described, operated from the other end of said shaft.

8. The combination, substantially as hereinbefore set forth, of a shaft electrically revolved, a subsidiary shaft deriving its motion therefrom, an indicator, and a dial-recorder, substantially such as described, simultaneously operated by the revolutions of said subsidiary shaft.

In testimony whereof I have hereunto subscribed my name this 14th day of August, A. D. 1882.

ROBERT J. SHEEHY.

Witnesses:
DANIEL W. EDGECOMB,
CHARLES A. TERRY.